US007206405B2

(12) United States Patent
Enriquez et al.

(10) Patent No.: US 7,206,405 B2

(45) Date of Patent: Apr. 17, 2007

(54) ENHANCED HIGH VOLTAGE INTERFACE FOR PARTITIONED SUBSCRIBER LINE INTERFACE CIRCUIT

(75) Inventors: Leonel Ernesto Enriquez, Melbourne Beach, FL (US); Douglas L. Youngblood, Palm Bay, FL (US)

(73) Assignee: Intersil Americas Inc., Milpitas, CA (US)

( * ) Notice: Subject to any disclaimer, the term of this patent is extended or adjusted under 35 U.S.C. 154(b) by 926 days.

(21) Appl. No.: 10/179,777

(22) Filed: Jun. 25, 2002

(65) Prior Publication Data

US 2003/0169874 A1 Sep. 11, 2003

Related U.S. Application Data

(63) Continuation-in-part of application No. 10/091,976, filed on Mar. 6, 2002, now Pat. No. 7,050,577.

(51) Int. Cl.
*H04M 1/00* (2006.01)
*H04M 9/00* (2006.01)

(52) U.S. Cl. .................................................... 379/413

(58) Field of Classification Search ................ 379/413, 379/394, 395, 395.1
See application file for complete search history.

(56) References Cited

U.S. PATENT DOCUMENTS 4,315,106 A 2/1982 Chea, Jr. ................. 179/16 F
5,323,451 A 6/1994 Rosenbaum et al. ........ 379/399
5,428,682 A * 6/1995 Apfel ......................... 379/413
5,528,688 A 6/1996 Schorr ........................ 379/413
5,737,411 A 4/1998 Apfel et al. ................ 379/413
6,453,040 B1 9/2002 Burke et al. ........... 379/387.01
6,735,302 B1 * 5/2004 Caine et al. ................ 379/405

* cited by examiner

*Primary Examiner*—Curtis Kuntz
*Assistant Examiner*—Alexander Jamal
(74) *Attorney, Agent, or Firm*—Akerman Senterfitt; Neil R. Jetter

(57) ABSTRACT

A subscriber line interface circuit contains a high voltage analog section, and a low voltage and digital signal processing section, that monitors and controls the high voltage analog section. The high voltage analog section includes a dual mode tip/ring amplifier unit coupled to a subscriber loop pair, and an input signal receiving unit, that conditions input voice and low voltage signaling and ringing signals from the mixed signal section. Attributes of and/or enhancements to the high voltage section are used to improve the operational performance of the subscriber line interface circuit, in particular, low noise, low power, wide-bandwidth and wide dynamic range characteristics.

12 Claims, 3 Drawing Sheets

VCC
R1
R2
710
TVC/RVC
113/114
741
751
IOUT
740
742
730
720
R3
R4
VBAT

ENHANCED HIGH VOLTAGE INTERFACE FOR PARTITIONED SUBSCRIBER LINE INTERFACE CIRCUIT

CROSS-REFERENCE TO RELATED APPLICATION

The present application is a continuation-in-part of U.S. patent application Ser. No. 10/091,976, filed Mar. 6, 2002, now U.S. Pat. No. 7,050,555, issued May 23, 2006, by L. Enriguez et al, entitled: "Programmable Subscriber Line Interface Circuit Partitioned Into High Voltage Interface and Digital Control Subsections" (hereinafter referred to as the '976 application), assigned to the assignee of the present application and the disclosure of which is incorporated herein.

FIELD OF THE INVENTION

The present invention relates in general to telecommunication systems and subsystems therefor, and is particularly directed to the use of attributes of and/or enhancements to selected portions of the high voltage section of the partitioned subscriber line interface circuit (SLIC) disclosed in the above-referenced '976 application, to improve the operational performance of the SLIC, in particular, low noise, low power, wide bandwidth and wide dynamic range characteristics thereof.

BACKGROUND OF THE INVENTION

Telecommunication service providers use subscriber line interface circuits (SLICs) to interface a communication wireline pair with subscriber (voice/data) communication equipment. In order to be properly interfaced with various telecommunication circuits, including low voltage circuits having digital codec functionality, the transmission channels of the SLIC must conform with a very demanding set of performance requirements. These requirements include, but are not necessarily limited to accuracy, linearity, low noise, filtering, insensitivity to common mode signals, low power consumption, and ease of impedance matching programmability.

Moreover, in a typical application, the length of the (copper) wireline pair to which a SLIC is connected can be expected to vary among installations, and may have a significant length (e.g., on the order of multiple miles), transporting both substantial DC voltages, as well as AC signals (e.g., voice and/or ringing). These multiple and diverse factors have made it difficult to realize a SLIC implementation that has 'universal' use in both legacy and state of the art installations.

Advantageously, this problem has been successfully addressed by the 'partitioned' SLIC architecture disclosed in the '976 application, a block diagram of which is shown in FIG. 1 and a detailed schematic diagram of which is shown in FIGS. 2 and 3. To facilitate an appreciation of the present invention's enhancements to the high voltage section of the partitioned SLIC architecture of the '976 application, that architecture will be now be reviewed.

Referring to FIG. 1, the partitioned SLIC of the '976 application is shown as having a high voltage analog section 100, and a mixed signal (low voltage and digital signal processing) section 200. The high voltage section 100 performs analog (voice, ringing, etc.) signal processing and interface functions of a conventional SLIC, and contains an integrated arrangement of functional analog signal blocks or units, parameters for which are digitally programmable and operations of which are monitored by mixed signal section 200.

On its subscriber loop side, the high voltage analog section interfaces respective tip (T) and ring (R) conductors 11, 12 of a twisted conductor pair 10. On its mixed signal interface side, the high voltage analog section interfaces a DSP codec subsection 200C and a supervisory microcontroller subsection 200S, that sets parameters and controls the operation of the high voltage section.

For this purpose, the high voltage section has a receive input unit 110 that interfaces and conditions voice signals and associated ancillary signals, such as ringing signals, from DSP codec subsection 200C. A voice signal receiving port 111 is interfaced with voice signals VRX supplied by the codec. A reference bias voltage for the receive input unit 110 is coupled to a reference port 115 thereof by a bias unit 120, having an input port 121 coupled to receive a reference voltage REF from the codec.

The reference voltage REF is selected in accordance with the available voltage parameters of the circuit and may lie at a midpoint between Vcc and ground. For reduced voltage circuit applications, such as those operating at value on the order of three volts, the reference voltage REF may correspond to a voltage on the order of 1.5 VDC. The receive input unit 110 has a bias current supply port 116 coupled to a bias current supply bus 19 through which respective bias currents are supplied from a control and latch interface unit 190. The control and latch interface unit 190 comprises a set of input latches and associated output drive circuits, through which respective values of bias currents are defined by the supervisory microcontroller subsection 200S, for application to various ones of the functional blocks or units of the high voltage section 100.

The receive input unit 110 further includes an analog feedback monitor (AFM) port 112, that may be used to close an amplifier loop from the output 133 of a sense amplifier (SA) 130 through an output CH port 133 to an auxiliary/external amplifier, to synthesize the output impedance of a dual mode tip and ring amplifier unit 140. A bias current for the sense amplifier 130 is coupled to a bias current supply port 134 from the bias current supply bus 19, while the tip/ring amplifier unit 140 has a bias current supply port 144 coupled to the bias current supply bus 19. Receive input unit 110 further includes Tip Voltage Control (TVC) and Ring Voltage Control (RVC) inputs 113 and 114, respectively, through which the controller independently controls signaling parameters of the SLIC as presented to tip and ring ports 11 and 12. Driving these inputs with appropriate AC and DC voltage levels allows for the selection of balanced, unbalanced, or offset ringing.

On its output side, the receive input unit 110 has a tip output port 117 coupled to a signal input port 141T of a tip amplifier 140T, and a ring output port 118 coupled to a signal input port 141R of a ring amplifier 140R within the dual mode tip/ring amplifier unit 140. The tip amplifier 140T has a bias reference input port 142T, while the ring tip amplifier 140R has a bias reference port 142R. These reference ports are coupled via a battery bias unit 150 to a battery supply switch unit 160, to which respective high and low battery voltages VBH and VBL are coupled.

Battery bias unit 150 contains a set of selectively controlled voltage dividers, that are used to selectively bias the tip and ring amplifiers 140T and 140R, when operated as close-to-unity gain amplifiers for a first signal mode, such as voice signal processing and caller ID, or as increased or 'boosted' gain amplifiers for a second signal mode, such as ancillary (e.g., on-hook) signal processing (e.g., ringing) and other non-signalling modes.

The battery supply switch 160 provides for the selection of either the high battery voltage VBH or low battery voltage VBL, and is independent of operating mode. (As a non-limiting example, the low battery voltage VBL may be on the order of −50 VDC or less and the high battery voltage VBH may be on the order of −125 VDC or less.) In the course of changing operating states, the battery switch may be operated prior to or simultaneously with the device mode/state change to minimize duration and power of off-hook transients. The high battery voltage VBH may be enabled for line test, ringing and on-hook modes, to provide MTU compliance at the two wire interface.

The tip amplifier 140T has its output port 143T coupled to the tip port 11, while the ring amplifier 140R has its output port 143R coupled to the ring port 12. In addition, tip amplifier output port 143T is coupled to a first input 131 of sense amplifier 130 and to tip current sense input port 171T of a tip and ring current sense unit 170. Similarly, the ring amplifier output port 143R is coupled to a second input 132 of sense amplifier 130 and to a ring current sense input port 171R of the tip and ring current sense unit 170. The tip and ring current sense unit 170 contains respective tip and ring path loop detectors, that are used to provide scaled versions of sensed tip and ring currents for application via tip and ring current monitoring ports TIM and RIM of a diagnostic port unit 180 to mixed signal controller 200S subsection.

Also coupled with the outputs of the tip and ring amplifiers 140T and 140R of the dual mode tip and ring amplifier unit 140 is a transient current limiter unit 145, which is operative to limit the current drive capability of the tip and ring amplifiers until DC feed parameters are established by the codec. This current limiting feature limits potentially significant currents, such as those in excess of several hundred milliamps, which can flow in the subscriber loop, when the phone goes off hook in idle or ringing states, or when a fault condition occurs. The current limiting unit 145 has a transient current limit TL input 146, to which an external resistor referenced to ground is coupled in order to program the current limit threshold. The manner in which the output 147 of the current limiting unit 145 is used to limit the current in the circuitry of the tip and ring amplifiers is described below.

Attention is now directed to FIG. 2 wherein the circuitry of the high voltage analog section 100 of the SLIC functional block architecture of FIG. 1 is shown in detail.

Receive Input Unit 110; Bias Unit 120

The receive input (input signal receiving) unit 110 includes a voice signal receiver block 210, shown in FIG. 2 as a voltage-sense, current-feed circuit, coupled to the voice signal receiving port 111, to which voice signals VRX supplied from the mixed signal codec subsection 200C are applied. Voice signal receiver block 210, as well as tip and ring DC/RING current generators 290 and 390 are configured as voltage-sense, current-feed circuits. In accordance with a preferred, but non-limiting embodiment, such voltage-sense, current-feed circuits may be implemented as transconductance amplifier circuits of type described in U.S. patent application Ser. No. 09/639,408, filed Aug. 14, 2000 (hereinafter referred to as the '408 application), now U.S. Pat. No. 6,411,163, issued on Jun. 25, 2002, to L. Enriquez, entitled: "Transconductance Amplifier Circuit," assigned to the assignee of the present application and the disclosure of which is incorporated herein.

The input port 111 of voice signal receiver block 210 is coupled through a sense resistor 212 (shown as having a resistor value R/1.4) to the reference port 115, to which the reference voltage REF is supplied from the codec via the bias unit 120, as described above. In response to a voice representative voltage signal applied across the voice signal receiving port 111 and the reference voltage terminal 115, sense resistor 212 produces a received current irx representative of the applied voice signal.

Complementary polarity copies of this current irx are regenerated by a pair of (tip and ring associated) current sources 215 and 216 (which may be implemented as current mirrors within the voltage-sense, current-feed, transconductance amplifier circuits of the type described in the above-referenced '408 application), and applied over signal lines 217 and 218 to respective tip and ring amplifier blocks 220 and 230 of the dual mode tip and ring amplifier unit 140. A bias current ibrx for enabling operation of the current sources 215 and 216 of the voice signal receiver block 210 is supplied from the bias current bus 19. Signal lines 217 and 218 are also switchably coupled to receive currents from respective tip- and ring-associated DC/RING current generators 290 and 390.

In addition to its voice signal receiving port 111 and associate sense resistor 212, the voice signal receiver block 210 has an auxiliary sense resistor 212A coupled between the voltage reference port 115 and the analog feedback monitor (AFM) port 112. As pointed out above, the AFM port 112 provides the ability to close a loop from the output 133 of the sense amplifier 130 through an external amplifier, in order to synthesize an impedance at the output of the tip and ring amplifier blocks 220/230.

Sense Amplifier 130

The sense amplifier 130 is shown as comprising a pair of voltage detectors 410 and 420 coupled in series through a resistor 405 (which may have a value on the order of 11.2 kohms, as a non-limiting example) between a CH output port 133 and GND. A bias current ibsa for the voltage detectors of the sense amplifier 130 is supplied by control and latch interface unit 190. The parametric values of the sense amplifier resistor 405 and those of tip and ring amplifier blocks' sense resistors 264 and 364 (to be described) are selected so that they effectively match one another in the sense of the output transfer function of the tip and ring amplifiers as coupled to the sense amplifier's voltage detector circuitry. Since the voltages across the tip and ring sense resistors of the tip/ring amplifier block are coupled in complementary-polarity fashion to the series-coupled voltage detectors 410 and 420, the sense amplifier's output port 133 will provide a voice signal summation output for differential mode voice signals, whereas common mode signals will mutually cancel one another. As shown in FIG. 1, the sense amplifier's output port CH may be AC (capacitor) coupled to an auxiliary circuit, such as to the inverting input 101 of an external operational amplifier 105, the output 103 of which may be fed back to AFM port 112. Coupling the output of the sense amplifier 400 through an external amplifier to the AFM port enables the AFM port to provide a synthesized impedance at the output of the tip and ring amplifiers. The external amplifier also serves as a precise current to voltage converter, which feeds voice band signals into the codec section 200C.

Tip/Ring Amplifier Unit 140

As described briefly above, each tip and ring dual mode amplifier block 220/230 of the dual mode, tip and ring amplifier unit 140 is selectively biased to place tip and ring at specified DC voltages, in accordance with the mode of operation of the SLIC. For example, each tip and ring portion of this tip/ring amplifier unit may be biased to have a first, relatively low gain (close-to-unity e.g., G=1 or 1.4) for a first, noise minimization signaling mode (on-hook signaling (e.g., caller ID) and off-hook voice transmission), and an increased or high gain for a second signaling mode (e.g., G=30 for DC biasing of tip/ring, and G=120 for ringing and testing). The tip amplifier block 220 is preferably configured of bipolar transistor components, having first and second front end transconductance circuits sections 240 and 250, outputs of which are coupled to a shared operational amplifier unity gain section 260. Likewise, the ring amplifier block 230 has front end transconductance circuits sections 340 and 350, whose outputs are coupled to a shared operational amplifier unity gain section 360.

Within the tip amplifier block 220, the front end gain section 240 is used for voice signal processing, while its companion front end gain section 250 is used for ancillary signaling. Under processor control, one of the two front end sections 240 and 250 is selectively enabled by the application of an enabling bias current ibtip from a tip bias current source 222, that mirrors a current ibtip supplied by the control and latch interface 190. The output of the tip bias current source 222 is selectively coupled through a switch 224 to one of a pair of bias current supply lines 226 and 228, respectively feeding bias current to input terminals 245 and 255 of front end sections 240 and 250. The path through bias current supply switch 224 is controlled by a control signal ibsw supplied over link 327 from the control latch interface 190.

The tip path's voice signal front end section 240 has an inverting (–) input 241 coupled to the signal line 217, through which the above-referenced voice signal current irx is supplied, and a non-inverting input 242, that is coupled to receive a prescribed battery supply-based, reference bias voltage from the battery bias unit 150. The output 243 of the tip amplifier's front end section 240 is coupled to input 261 of the unity gain stage 260. For the present example, the effective gain through voice signal transmission path section 240 of the dual mode, tip amplifier block 220 is a close-to-unity value of R/R/1.4 or 1.4.

The ancillary signal mode front end section 250 of the tip amplifier block 220 has an inverting (–) input 251 coupled to a DC/RING line 297, through which an ancillary current idc&rng_tip is supplied from a tip associated DC/RING current generator circuit 290 (described below) within the receive input block 110, and a non-inverting input 252 coupled via the tip path voltage divider network 270 to mode 163 of the battery supply switch 160. The ancillary signal mode front end section 250 also has its output 253 coupled to the input 261 of the unity gain stage 260. In response to a Tip Voltage Control signal TVC applied across the TVC input port 113 and the reference voltage terminal 115, the sense resistor 292 produces a DC/RING current idc&ring_tip. This current idc&ring_tip is regenerated by current source 295 and applied via one of the paths through a switch 296 to either the voice signal line 217 or the DC/RING signal line 297. For the parameters of the present example, the effective gain of the ancillary signal path of tip amplifier block 220 is 4R/R/30 or 120 when connected to terminal 297 and R/R/30 or 30 when connected to terminal 298.

The unity gain stage 260 of the tip amplifier block 220 has its output 263 coupled through a current sense resistor 264 (which may have a relatively small value on the order of 15 ohms, as a non-limiting example) to a TIP output port 266. TIP port 266 and an associated RING port 366 at the output of the ring amplifier block 230 are coupled to the tip and ring current sense unit 170, through which the respective TIP and RING outputs 143T and 143R of the tip and ring amplifier unit 140 may be selectively terminated (via a switch 273 operated by a loopback current line iblb) across a resistor 271 having a prescribed loop resistance (e.g., 600 ohms) of a loopback circuit 275.

Under processor control, the tip amplifier unity stage 260 is selectively enabled by the application of an enabling bias current idis_tip supplied to an enable input 265. The gain of the voice signal section of the dual mode, tip amplifier block 220 is defined by the ratio of a feedback resistor 267 (shown as having a resistor value R) coupled between the connection of the TIP port 266 and the inverting input 241 of the front end section 240 to a front end resistor 212 (shown as having a value R/1.4) within the RECV block 210. The current through the input resistor 212 of the voice signal receiver block 210 is mirrored by the current source 215, which is coupled to the inverting (–) input 241 of the tip amplifier's front end section 240. Accordingly, the effective gain of the voice path section of the dual mode, tip amplifier block is R/R/1.4 or 1.4.

For on-hook, low voltage operation (e.g., caller ID signaling) and off hook DC voltage, the gain of tip amplifier through the front end section is defined by the ratio of the feedback resistor 267 to a front end sense resistor 292 (shown as having a value of R/30) within the tip associated DC/RING current generator circuit 290, to produce a boost or gain (e.g., 1×30=30) for a relatively small value (on the order of a volt or so) signal applied to TVC input port 113 of the receive input block 110. Bias current for a current source 295 is supplied by a bias input line 299 providing bias current ibdrt from control and latch interface 190.

For ringing operation, the gain of the dual mode, tip amplifier block 220 is defined by the (larger valued) ancillary path feedback resistor 268 (shown as having a resistor value 4R) coupled between the connection of the TIP port 266 and the inverting (–) input 251 of the front end section 250. Namely, this relatively larger gain value is used in combination with front end resistor 292 (shown as having a value of R/30) within the tip associated DC/RING current generator circuit 290, to produce a very large boost or gain (e.g., 4×30=120) of a ringing signal waveform applied to TVC port 113.

The ring amplifier block 230 is configured identically to the tip amplifier block 220, described above, having a pair of front end transconductance circuits sections 340 and 350, outputs of which are coupled to the shared unity gain section 360. Front end gain section 340 is used for (off-hook and on-hook) voice signal processing, while front end gain section 350 is used in the ancillary (on-hook, ringing) state. Under processor control, one of the two front end sections 340 and 350 of the ring amplifier block 230 is selectively enabled by the application of an enabling bias current ibring supplied by a ring bias current source 322, which mirrors current ibring supplied by control and latch interface 190.

The bias current ibring from the ring bias current source 322 is selectively coupled through a switch 324 to one of a pair of bias current supply lines 326 and 328 feeding bias current input terminals 345 and 355 of the respective front end ring amplifier sections 340 and 350. The path through bias current supply switch 324 is controlled by signal ibsw from control latch interface 190.

The ring path voice signal mode section 340 has an inverting (–) input 341 coupled to the complementary polarity voice current signal line 218, through which the complementary polarity copy of the voice signal current irx is supplied, and a non-inverting input 342 coupled via ring voltage divider network 370 of the battery bias unit 150 to the battery supply switch 160. As with the tip path, the ring path voltage divider network 370 is used to selectively scale the battery voltage provided by the battery supply switch unit 160 to an appropriate reference level for the enabled one of the two front end gain sections 340/350 of the dual mode ring amplifier 230. The ring path voice signal mode section 340 is coupled to input 361 of unity gain stage 360.

The ring signal path's ancillary signal mode front end section 350 has an inverting (−) input 351 coupled to a DC/RING signal line 357, through which an ancillary current idc&rng_ring is supplied from a ring associated DC/RING current generator circuit 390, and a non-inverting input 352 coupled via the ring path voltage divider network 370 to switch 276 and mode 163 of the battery supply switch unit 160. The ancillary signal mode front end section 350 has its output 353 coupled to the input 361 of the unity gain stage 360. The unity gain stage 360 has its output 363 coupled through a current sense resistor 364 to a RING output port 366. Under processor control, the ring amplifier gain stage 360 is selectively enabled by the application of an enabling bias current idis_ring supplied to an enable input 365 by control and latch interface 190.

Under processor control, the ring amplifier unity stage 360 is selectively enabled by the application of an enabling bias current idis_ring supplied to an enable input 365. The gain of the voice signal section of the dual mode, ring amplifier block 230 is defined by the ratio of a feedback resistor 367 (shown as having a resistor value R) coupled between the connection of the TIP port 366 and the inverting input 341 of the front end section 340 to front end resistor 212 (having a value R/1.4) within the RECV block 210. The current through the input resistor 212 of the voice signal receiver block 210 is mirrored by the current source 216, which is coupled to the inverting (−) input 341 of the ring amplifier's front end section 340. Accordingly, the effective gain of the voice path section of the dual mode, ring amplifier block is R/R/1.4 or 1.4.

For on-hook, low voltage operation (e.g., caller ID signaling) and off-hook DC voltage, the gain of ring amplifier through the front end section is defined by the ratio of the feedback resistor 367 to front end sense resistor 392 (shown as having a value of R/30) within the ring associated DC/RING current generator circuit 290, to produce a boost or gain (e.g., 1×30=30) for a relatively small value (on the order of a volt or so) signal applied to TVC input port 113 of the receive input block 110. Bias current for a current source 395 is supplied by a bias input line 399 providing bias current ibdrt from control and latch interface 190.

Similar to the tip path for ringing mode signalling, the gain of the dual mode, ring amplifier block 230 is defined by the ancillary path feedback resistor 368 (shown as having a resistor value 4R) coupled between the connection of the RING port 366 and the inverting (−) input 351 of the front end section 350. As pointed out above in connection with the tip signal path, this larger gain value is used in combination with a front end sense resistor 392 (shown as having a value of R/30) within the ring associated DC/RING current generator circuit 390, to produce a very large gain for the value of a ringing signal applied to RVC port 114. Bias current for a current source 395 is supplied by a bias input line 399 providing a bias current ibdrr supplied by control and latch interface 190.

Thus, for a ringing signal applied across the RVC port 114 and the reference voltage terminal 115, the sense resistor 392 produces a DC/RING current idc&rng_ring, which is regenerated by the current source 395 and applied via path 398 through a switch 396 to the ring path DC/RING signal line 357. For the parameters of the present example, the effective gain of the ancillary signal path of ring amplifier block 230 is 4R/R/30 or 120.

Output Current Limit Unit 145

The current drive capability of the tip and ring amplifiers is limited by the DC feed transient current limiter unit 145, until DC feed parameters are established by the mixed signal controller subsection 200S, to prevent potentially significant currents, such as those in excess of several hundred milliamps, from flowing in the subscriber loop when the phone goes off hook in idle or ringing states, or when a fault condition occurs. The manner in which this is accomplished for the case of limiting source current is shown in FIG. 3, which is a partial schematic diagram of the tip path through tip path front end section 250 and gain stage 260. A similar diagram applies to the sink current limit with a corresponding change in current polarity. It should be noted that the same mechanism is employed in the ring path amplifier.

For normal operation, an error current $I_{ERR}$ through a diode 471, which couples the output 253 of front end stage 250 and a reference current $I_{REF}$, is zero. In this state, the output voltage is determined by the signal current $I_{SIG}$ multiplied by the value $R_F$ of the feedback resistor 268. With the current polarity as shown for $I_{SIG}$, the output voltage moves positive with respect to VB/3 (or VBAT/3) . Where the amplifier output is driving a load at a more negative potential, then the amplifier output will source current.

During an excessive output source current flow, the scaled output current Io/K will exceed the reference current $I_{REF}$, forcing the flow of error current $I_{ERR}$. The error current will be subtracted from the signal current, to reduce the amplifier output voltage. By reducing the output voltage, the sourced current to the load is also reduced, and the output current is limited.

Battery Bias Unit 150

The battery bias unit 150 comprises a pair of tip and ring voltage divider networks 270 and 370, that are used to selectively scale the battery voltage supplied by the battery supply switch 160 to appropriate reference levels for the front end gain sections of the dual mode tip and ring amplifiers. For this purpose, the tip voltage divider 270 includes a first resistor 272 (shown as having a value 1.6R), which is coupled to input 242 of tip amplifier front end 240 and input 252 of tip amplifier front end 250. Resistor 272 is coupled in series with a second resistor 274 (shown as having a value 3.2R), which is coupled through a tip network switch 276 to the battery supply switch output port 163. Similarly, on the ring side, the ring voltage divider 370 includes a first resistor 372 (having a value 1.6R), which is coupled to input 342 of ring amplifier front end 340 and input 352 of ring amplifier front end 350. Resistor 372 is coupled in series with a second resistor 374 (having a value 3.2R), which is coupled through a ring network switch 376 to the battery output port 163.

When the tip network switch 276 is open, the tip voltage divider network 270 is isolated from the battery supply switch 160, so that ground (GND) is coupled through resistor 272 to inputs 242, 252 of the tip amplifier front ends 240, 250. In addition, when switch 276 is open the tip amplifier is maintained in a reduced power dissipation condition. On the other hand, when the tip network switch 276 is closed, the tip voltage divider 270 applies one-third of the battery voltage (VBAT/3, which has a value of either VBL/3 or VBH/3)) to inputs 242, 252 of the tip amplifier front ends 240, 250.

Similarly, when the ring network switch 376 is open, the ring voltage divider 370 is isolated from the battery supply switch 160, and ground (GND) is coupled through resistor 272 to inputs 342, 352 of the ring amplifier front ends 340, 350. In addition, when switch 376 is open the ring amplifier is maintained in a reduced power dissipation condition. Conversely, when the ring network switch 376 is closed, the ring voltage divider 370 applies a voltage on the order of one-third of the battery voltage (VBAT/3) to inputs 342, 352 of the ring amplifier front ends 340, 350 (ignoring the diode drops of diodes 284 and 285) in the battery supply switch. The use of one-third battery voltage value (VBAT/3) optimizes power consumption and overhead drive. In addition, dividers 270 and 370 provide power for driving a companion circuit.

This ability to selectively control DC voltage settings enables the SLIC to minimize power during on-hook modes, while being maintained in a 'ready to go' condition, in anticipation of the user going off-hook, and be ready for transmission. As described above, the reference voltage REF is supplied by the codec and the signals applied to the TVC and RVC inputs vary above and below this value. Thus, when the input voltage is more positive than the reference, current will flow from the two-wire interface to the inverting input of the feed amplifier, driving the tip or ring terminal positive with respect to VBAT/3. On the other hand, if the input voltage is more negative than the reference voltage, current will flow into the two-wire interface to the inverting input of the feed amplifier, driving the tip or ring terminal negative with respect to −VBAT/3.

Therefore, for the high gain mode described above, the voltages $V_{TIP}$ and $V_{RING}$ at the tip and ring terminals may be defined respectively as:

$$V_{TIP}=(V_{TVC}-V_{REF})\times 120-|(V_{BAT})/3|$$

$$V_{RING}=(V_{RVC}-V_{REF})\times 120-|(V_{BAT})/3|$$

Similarly, for low gain mode:

$$V_{TIP}=(V_{TVC}-V_{REF})\times 30-|(V_{BAT})/3|$$

$$V_{RING}=(V_{RVC}-V_{REF})\times 30-|(V_{BAT})/3|$$

Where VBAT (287) voltage may be connected to either VBL or VBH.

Battery Supply Switch Unit 160

The battery supply switch 160, to which the battery bias unit 150 is coupled, is used to selectively couple one of a relatively low battery voltage VBL applied to battery supply switch input port 161, and a relatively high battery voltage VBH applied to battery supply switch input port 162, to an output port 163. (As pointed out above, the low battery voltage VBL may be on the order of −50 VDC or less and the high battery voltage VBH may be on the order of −125 VDC or less.) The battery supply switch output port 163 is switchably coupled to each of tip path voltage divider network 270 and ring path voltage divider network 370 within the battery bias unit 150. The choice of which battery voltage is to be supplied depends upon the state of battery supply switch unit 160 whose operation is controlled by a control current ibbs from control and latch interface 190.

For this purpose, the low battery voltage VBL port 161 is coupled through respective diodes 284, 285 to nodes 381, 382 of a double-pole, single-throw switch 380. Diodes 284, 285 allow transitioning to low battery operation, in the event the high battery is removed or the switch is opened. Switch 380 is controlled by the battery supply switch control signal ibbs. Nodes 381, 382 of the switch 380 are further coupled to respective battery monitoring nodes 286 and 287, and to various circuits of the SLIC. Node 286 may be coupled to power transistors, while node 287 may be coupled to circuits other than power transistor circuits. Normally open nodes 384 and 385 are coupled in common to the high battery voltage VBH port 162.

To monitor the battery voltage, a copy of the current ibat drawn through the tip/ring voltage divider networks from the battery supply switch output terminal 163 is replicated by a current source 461 within a battery monitor unit 460 of the diagnostic port unit 180 and applied through a monitor resistor 462 (having a resistor value of R/50) to the reference voltage terminal REF. The resulting voltage drop across the battery voltage monitor resistor 462, is proportional to the battery voltage VBAT being coupled through battery supply switch unit 160. This voltage is coupled to a battery voltage monitor port BVM.

Tip and Ring Current Sense Unit 170

As pointed out above, the unity gain stage 260 of the tip amplifier block 220 has its output 263 coupled through a current sense resistor 264 to the TIP output port 266, and the unity gain stage 360 of the ring amplifier block 230 has its output 363 coupled through a current sense resistor 364 to RING output port 366. In order to monitor the voltages across these sense resistors, each resistor is coupled to a loop detector 430 within the tip and ring current sense unit 170.

In particular, the tip path sense resistor 264 is coupled to a tip path voltage detector circuit 432, the output of which is coupled to tip current monitoring (TIM) port 434. Likewise, the ring path sense resistor 364 is coupled to a ring path voltage detector circuit 433, the output of which is coupled to a ring current monitoring (RIM) port 435. Each of these voltage detector circuits provides a scaled version of the sensed current through the TIM and RIM ports diagnostic port unit 180 to the front end digital-to-analog converter for the processor 200S. A loop detector bias current ibld for the voltage detectors of the loop detector 430 is supplied by control and latch interface 190. The TIM and RIM ports may be coupled to external resistors (not shown), voltage drops across which are monitored by the codec to control/adjust the Tip Voltage Control signal TVC applied to the tip side input port 113 not shown, and the Ring Voltage Control signal RVC applied to the ring side input port 114 not shown. This ability to make adjustments in response to monitoring the loop current provides for software control of a variety of functions, such as loop current-limiting, switch hook, ground key, and ring trip threshold settings.

SUMMARY OF THE INVENTION

The present invention is directed to the use of functional and operational aspects of and/or enhancements to selected portions of the high voltage section of the partitioned subscriber line interface circuit (SLIC) disclosed in the above-referenced '976 application, to improve its performance, in particular, low noise, low power, wide bandwidth and wide dynamic range characteristics. In accordance with a first aspect of the invention, the multiple gain capability of the dual mode tip and ring amplifier units and the biasing circuitry for their dual front end transconductance circuits sections are used to provide increased dynamic range at low power. The ability to select an increased gain path through a respective amplifier's high gain section and switchably couple the amplifier's reference voltage input to a relatively small voltage (e.g., VBAT/3) means that only a relatively small input current is necessary to deflect the amplifier from its reference voltage value. This is especially useful where there are not significant noise conditions on the signaling path (e.g., for ringing, idle on-hook, and testing)

Pursuant to a second aspect of the invention, the ability to selectively open and close the switches of the tip and ring reference voltage divider networks is used to minimize unnecessary power dissipation. During on-hook, idle mode, the tip reference voltage should be close to ground, whereas the ring reference bias voltage should provide MTU compliance at the two wire interface. As a result, by opening the tip biasing network switch, the tip amplifier's voltage divider network is isolated from the battery supply switch, so that ground is coupled to the voltage reference inputs of the tip amplifier's front ends, keeping the tip amplifier in a reduced power dissipation condition. Simultaneously with this operation of the tip amplifier's bias network switch, closing the ring amplifier's bias network switch applies a voltage on the order of one-third of the battery voltage (VBAT/3) to the reference inputs of the ring amplifier's front ends for MTU compliance.

The ability to selectively open/close both the tip and ring amplifier bias network switches provides an additional degree of freedom, that allows the SLIC to be placed in a minimal (zero) power dissipation (powered down) mode. Opening both the tip and ring amplifiers'bias network switches will completely isolate all reference voltage inputs from the battery supply switch output port, thereby effectively placing the SLIC in a powered down mode.

In accordance with a third aspect of the invention, a zero-setting feed-forward network is coupled between inputs of the front end transconductance stages of the dual mode tip/ring amplifiers and the AFM port. This network serves to inject a loop gain-stabilizing pair of complementary zeros in the closed loop response characteristic. As a result, when the SLIC's tip/ring output ports are coupled to a very low resistance load (e.g., or a very low resistance length of wireline in series with a low resistance phone), the open loop gain of the SLIC is effectively inversely proportional to the load, thereby increasing the SLIC's bandwidth. The (zero-setting) feed-forward network contains an auxiliary tip path resistor-capacitor circuit coupled between the inverting input of the tip amplifier's unity gain transconductance section and the AFM port, while an auxiliary ring capacitor is coupled between the non-inverting (+) input of the ring amplifier's unity gain front end transconductance section and the AFM port.

As a fourth noise gain control feature, the values of supply rail coupling resistors of current mirrors within voltage-sense, current-feed circuits of the input signal receiving unit that feed the dual mode tip/ring amplifier unit are established in accordance with the available power supply rail headroom requirements and the need to mitigate against the Early voltage effect. These current mirror coupling resistor values are then used to define the lower limit of the value of the tip/ring amplifier feedback resistor R for optimal performance of the SLIC.

DETAILED DESCRIPTION

As pointed out briefly above, the present invention is directed to the use of attributes and/or enhancements to selected portions of the high voltage section of the partitioned subscriber line interface circuit (SLIC) disclosed in the above-referenced '976 application, that improve its operational performance, in particular, low noise, low power, wide bandwidth and wide dynamic range characteristics thereof. Pursuant to a first, increased dynamic range, aspect of the invention, the multiple gain capability of the dual mode tip and ring amplifier units 140T and 140R, and the manner in which the dual front end transconductance circuits sections thereof are biased provide a substantially increased dynamic range at low power.

Figure 2:
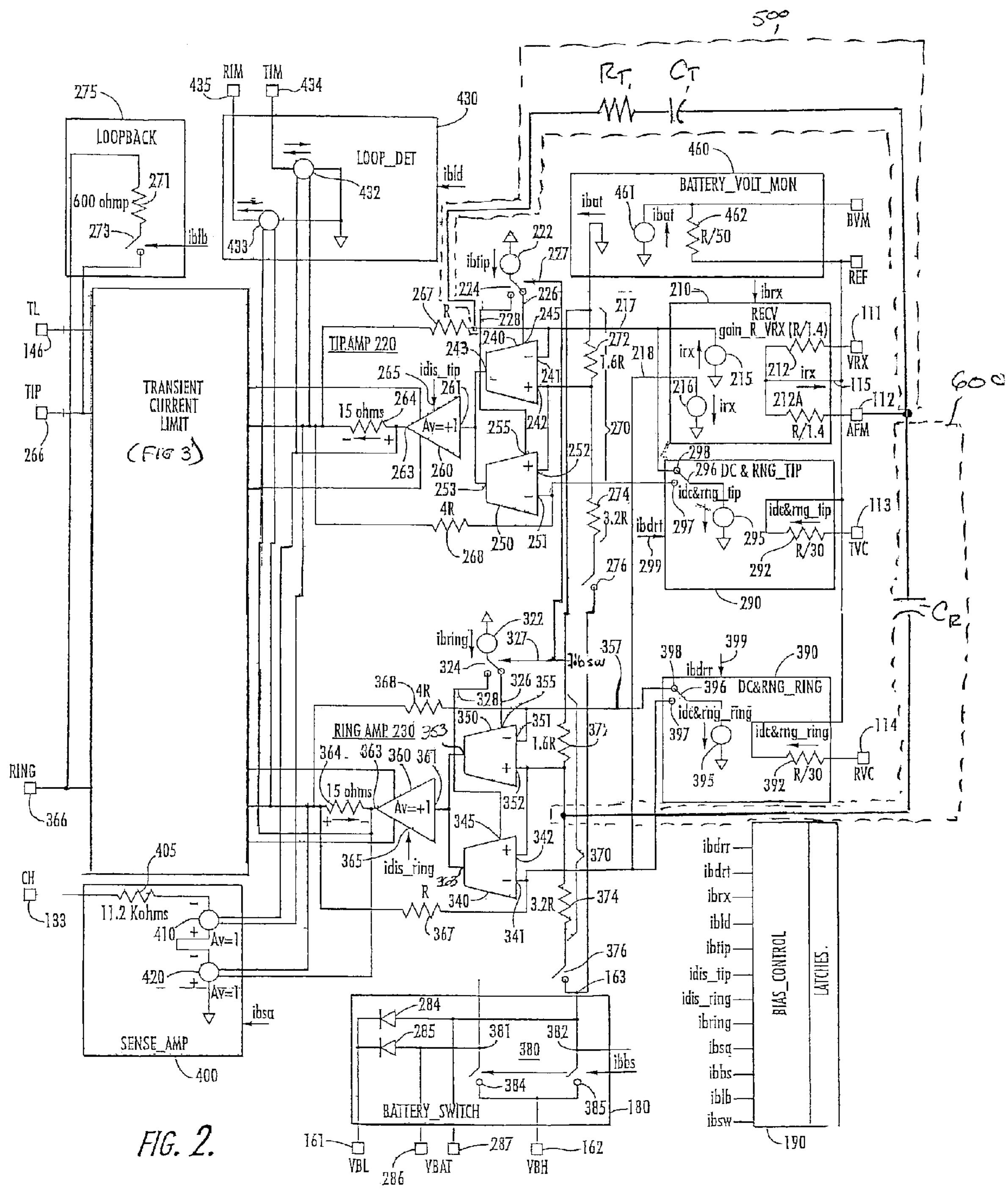
FIG. 2 shows circuit details of the high voltage analog section of the SLIC architecture of FIG. 1 and including a zero-setting feed-forward network in accordance with the present invention.

Unless otherwise indicated, for conciseness, the following discussion will focus essentially on the Tip path circuitry of FIG. 2, it being understood that a like analysis applies to the Ring path. As shown therein, the non-inverting (+) voltage reference input 242 of the tip amplifier's low gain front end tip amplifier section 240 and the non-inverting (+) voltage reference input 252 of its high gain front end tip amplifier section 250 receive bias voltages from the tip reference voltage divider network 270. Via switch 276, the tip reference voltage divider network 270 is switchably coupled between ground and the battery supply switch output port 163.

The ability to select an increased gain path, here through the amplifier's high gain section 250, and switchably couple the amplifier's reference voltage input to a relatively small voltage (VBAT/3) means that only a relatively small input current is necessary to deflect the amplifier from its reference voltage value. This is particularly useful where there are not significant noise conditions on the signaling path, such in the case of ringing, idle on-hook, and testing. Thus, being able to switch to an amplifier feedback path having a relative large feedback resistor (4R value resistor 268 in the case of the tip path, and 4R value resistor 368 in the case of the ring path) means that the SLIC's dual mode tip/ring amplifier can provide a substantially increased dynamic range at low power.

According to a second, power-saving, feature of the invention, advantage is take of the ability to selectively open and close the switches of the tip and ring reference voltage divider networks to minimize unnecessary power dissipation. For biasing the tip path amplifier, switch 276 is installed between one end (at resistor 274) of the tip reference voltage divider network 270 and battery supply switch output port 163. The other end of the tip reference voltage divider network 270 (at resistor 272) is coupled to ground. Similarly, for biasing the ring path amplifier, switch 376 is installed between one end (at resistor 274) of the ring reference voltage divider network 370 and battery supply switch output port 163, and the other end of the ring reference voltage divider network 370 (at resistor 372) is coupled to ground.

During on-hook, idle mode, the tip reference voltage should be close to ground, whereas the ring reference bias voltage should provide MTU compliance at the two wire interface. As pointed out above, opening the tip biasing network switch 276 isolates the tip voltage divider network 270 from the battery supply switch 160, so that ground (GND) is coupled through resistor 272 to inputs 242, 252 of the tip amplifier front ends 240, 250, thereby maintaining the tip amplifier in a reduced power dissipation condition. On the other hand, also closing ring network switch 376 will cause ring voltage divider 370 to apply a voltage on the order of one-third of the battery voltage (VBAT/3, e.g., VBH/3) to inputs 342, 352 of the ring amplifier front ends 340, 350 where again a small deflection is required, for MTU compliance, consuming minimum power.

In addition, the ability to selectively open/close both switches 276/376 provides an additional degree of freedom, that allows the circuit to be placed in a minimal (zero) power dissipation mode. As a non-limiting example, it may be necessary to temporarily place an installed SLIC in an inoperative condition (such as for lack of payment of telecommunication service charges, or in the case of a newly installed SLIC not yet placed in service). For a state such as this, instructing the digital signal processing section 200 to open both switches 276 and 376 serves to completely isolate all reference voltage inputs 242/252 and 342/352 from the battery supply switch output port 163, thereby effectively placing the SLIC in a powered down mode.

Figure 1:
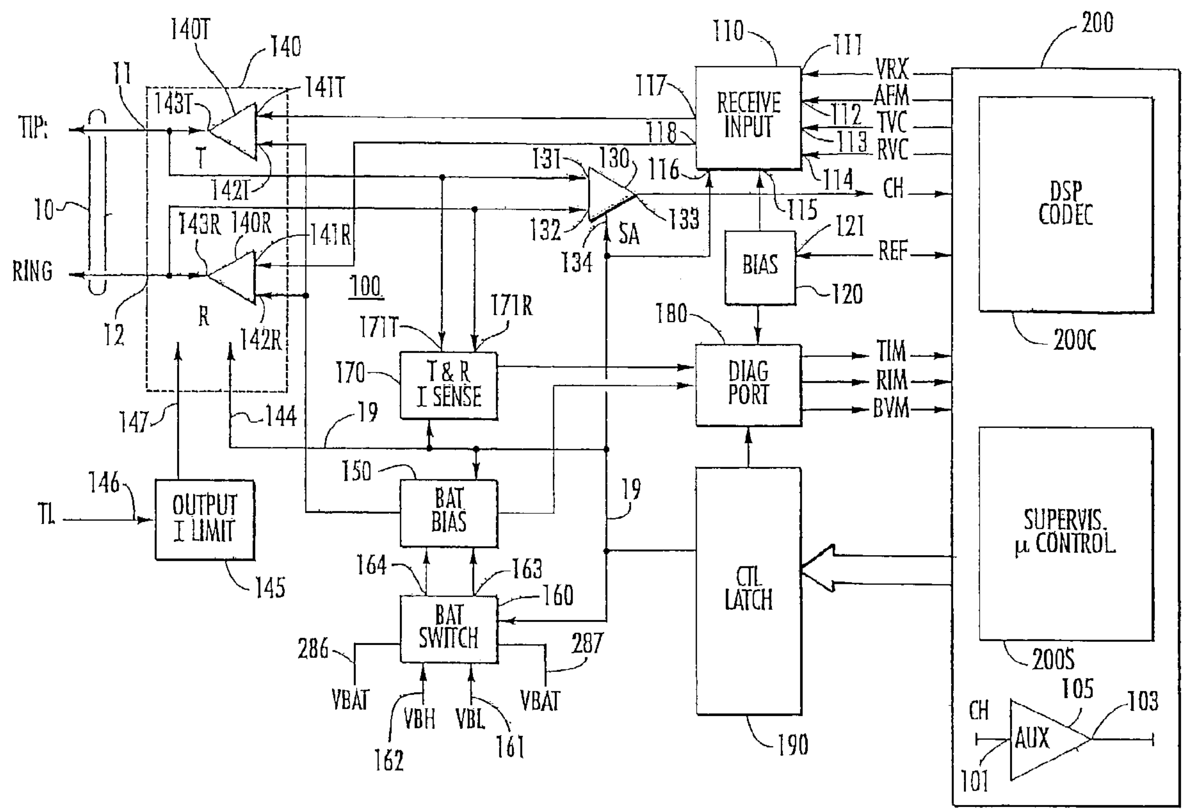
FIG. 1 diagrammatically illustrates the architecture of the partitioned subscriber line interface circuit disclosed in the '976 application.
Figure 3:
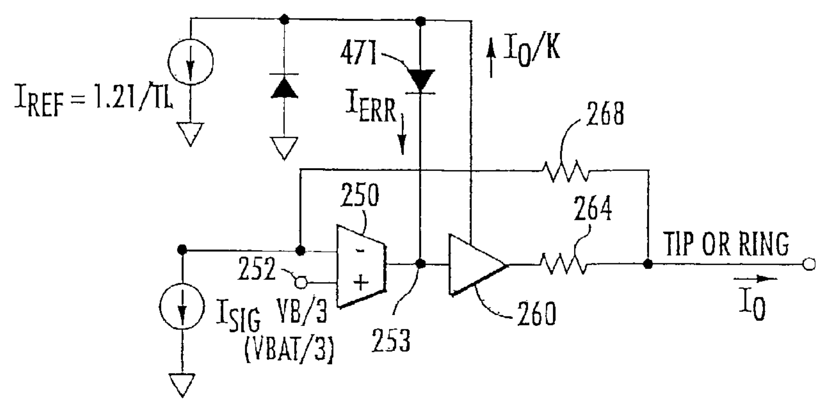
FIG. 3 is a schematic diagram of current limiting circuitry for the tip path front end section and gain stage of the tip/ring amplifier in the SLIC architecture of FIGS. 1 and 2.

Pursuant to a third aspect of the invention, advantage is taken of the presence of separate feedback resistor (R and 4R) connections for the commonly referenced non-inverting (+) inputs to the front end transconductance stages of the dual mode tip/ring amplifiers, to couple a zero-setting feed-forward network back to the AFM port 112. As pointed out previously, AFM port 112 provides the SLIC with the ability to close a loop through auxiliary amplifier 105. This network is diagrammatically illustrated in broken lines 500 and 600 in FIG. 1.

In particular, an auxiliary tip path resistor-capacitor (RC) network 500 containing an auxiliary tip resistor RT connected in series with a tip capacitor CT is coupled between the inverting (−) input 241 of the tip amplifier's unity gain transconductance section 240 and AFM port 112. Also, an auxiliary ring path circuit containing an auxiliary ring capacitor CR is coupled between the non-inverting (+) input 341 of the ring amplifier's unity gain front end transconductance section 340 and AFM port 112. These two circuits 500/600 serve to inject a loop gain-stabilizing pair of complementary zeros in the closed loop response characteristic. As a result, when the SLIC's tip/ring output ports are coupled to a very low resistance load (e.g., or a very low resistance length of wireline), the open loop gain of the SLIC is effectively inversely proportional to the load, thereby increasing the SLIC's bandwidth.

Figure 4:
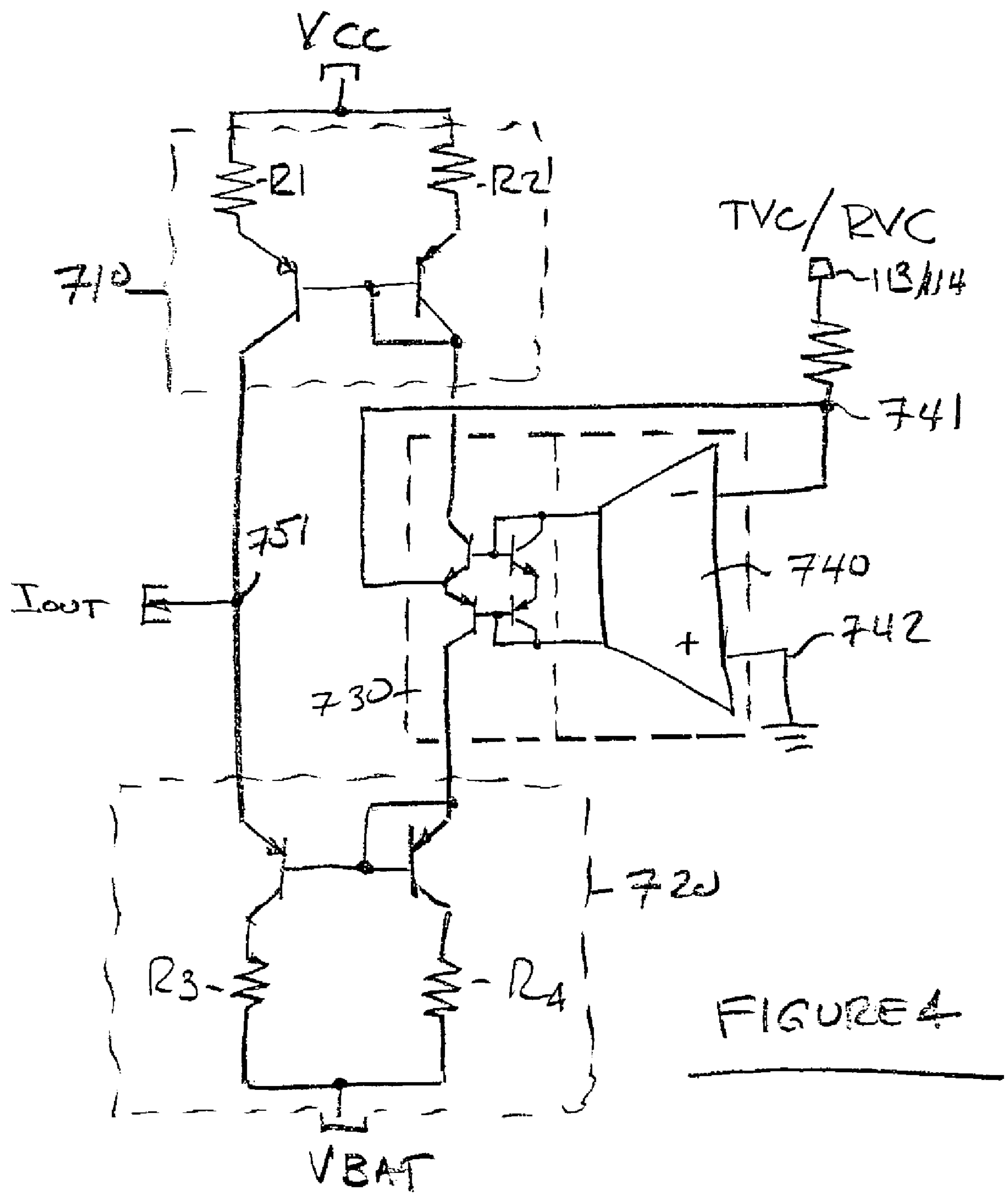
FIG. 4 is a reduced complexity circuit diagram showing voltage-sense, current-feed circuitry used to feed the TVC/RVC port 113/114 of the SLIC circuitry of FIGS. 1–3.

As pointed out above, various currents supplied by the input signal receiving unit 110 to the dual mode tip/ring amplifier unit 140 are generated by current mirror circuits of voltage-sense, current-feed circuits, which may be implemented as transconductance amplifier circuits of type described in the above-identified '408 application. As shown in the reduced complexity circuit diagram of FIG. 4, such a voltage-sense, current-feed circuit contains complementary supply rail current mirror circuits 710 and 720. These current mirror circuits are coupled to the output stage 730 fed by a unity gain buffer 740. A respective input port, such as TVC/RVC port 113/114 is coupled to an inverting (−) input 741 of unity gain buffer 740. The non-inverting (+) input 742 of unity gain buffer 740 is coupled to ground. The output current Iout from an output node 751 of the circuit of FIG. 4 corresponds to the output current produced by one of the current sources of the input signal receiving unit 110.

In order to mitigate against the Early voltage effect, the input/output legs of the complementary supply rail current mirrors 710, 720 contain supply rail-coupling resistors R1, R2 and R3, R4, as shown. Unfortunately, the presence of these resistors serves to reduce the available supply voltage headroom. To accommodate limited supply voltage headroom parameters (which are becoming increasingly more restricted, particularly as supply voltages drop to less than three volts), the values of the Early voltage compensations resistors should be zero (something which is not possible due to the Early voltage effect).

On the other hand, the ratio of the value R of the tip/ring amplifier feedback resistors (e.g., 267/367) to the values of the current mirror coupling resistors defines the noise gain. Pursuant to a fourth feature of the invention, as a trade-off between these two demands, the values of the supply rail coupling resistors of the current mirrors may first be established in accordance with the available power supply rail headroom requirements. These coupling resistor values will then proscribe how small the value of the tip/ring amplifier feedback resistor R can be chosen for optimal performance of the SLIC.

While we have shown and described various features of a preferred embodiment of the invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed is:

1. A high voltage analog circuit for a subscriber line interface circuit comprising:

an input signal receiving unit, that is operative to condition and interface input voice and low voltage signaling and ringing signals, supplied from a digitally programmable signal generation and processing unit;

a multi-mode, multigain tip/ring amplifier unit, having tip and ring outputs thereof adapted to be coupled to tip and ring conductors of a subscriber loop pair, and inputs coupled to receive and amplify said voice and low voltage signaling and ringing signals from said input signal receiving unit, in accordance with a selected mode of operation and gain of said subscriber line interface circuit; and a biasing unit, to which power for operating said high voltage analog circuit is coupled, and being operative to controllably couple bias voltages to said tip and ring amplifier sections of said multi-mode, multi-gain tip/ring amplifier unit in accordance with the mode of operation of said subscriber line interface circuit, and wherein, for high gain operation of said multi-mode, multi-gain tip/ring amplifier unit, said biasing unit is operative to switchably couple a relatively small voltage to a reference voltage port of said dual gain multi-mode tip/ring amplifier unit, such that only a relatively small input current is necessary to deflect said multimode, multigain tip/ring amplifier unit from its reference voltage value, and wherein said biasing unit contains a set of switchable voltage divider networks coupled between a relatively low magnitude reference voltage and a battery supply switch unit that is operative to selectively couple first and second battery voltages to said biasing unit, and wherein said biasing unit is operative to switchably decouple a tip path voltage divider network from said battery supply switch unit, while coupling said relatively low magnitude reference voltage through said decoupled tip path voltage divider network to a reference voltage port of a tip path front end transconductance circuit of said multi-mode, multi-gain tip/ring amplifier unit.

2. A high voltage analog circuit for a subscriber line interface circuit comprising:

an input signal receiving unit, that is operative to condition and interface input voice and low voltage signaling and ringing signals, supplied from a digitally programmable signal generation and processing unit;

a multi-mode, multi-gain tip/ring amplifier unit, having tip and ring outputs thereof adapted to be coupled to tip and ring conductors of a subscriber loop pair, and inputs coupled to receive and amplify said voice and low voltage signaling and ringing signals from said input signal receiving unit, in accordance with a selected mode of operation and gain of said subscriber line interface circuit; and a biasing unit, to which power for operating said high voltage analog circuit is coupled, and being operative to controllably couple bias voltages to said tip and ring amplifier sections of said multi-mode, multi-gain tip/ring amplifier unit in accordance with the mode of operation of said subscriber line interface circuit, and wherein, for high gain operation of said multi-mode, multi-gain tip/ring amplifier unit, said biasing unit is operative to switchably couple a relatively small voltage to a reference voltage port of said dual gain multi-mode tip/ring amplifier unit, such that only a relatively small input current is necessary to deflect said multi-mode, multi-gain tip/ring amplifier unit from its reference voltage value, wherein said multimode, multi-gain tip/ring amplifier unit comprises tip and ring sections, each of which contains a plurality of front end transconductance circuits coupled to a shared operational amplifier gain section, and having different valued feedback resistors coupled from an output of said gain section to inputs of respective ones of said front end transconductance circuits, that define respectively different gain characteristics with input resistors associated with drive signal currents from said input signal receiving unit.

3. The high voltage analog circuit according to claim 2, wherein said biasing unit contains a set of switchable voltage divider networks coupled between a relatively low magnitude reference voltage and a battery supply switch unit that is operative to selectively couple first and second battery voltages to said biasing unit, and wherein said biasing unit is operative to switchably decouple a tip path voltage divider network from said battery supply switch unit, while coupling said relatively low magnitude reference voltage through said decoupled tip path voltage divider network to a reference voltage port of a tip path front end transconductance circuit of said multi-mode, multi-gain tip/ring amplifier unit.

4. The high voltage analog circuit according to claim 3, wherein said biasing unit is further operative to switchably couple a ring path voltage divider network between said battery supply switch unit and a reference voltage port of a ring path front end transconductance circuit of said multi-mode, multi-gain tip/ring amplifier unit, to provide MTU compliance for said subscriber loop pair.

5. The high voltage analog circuit according to claim 2, wherein said biasing unit contains a set of switchable voltage divider networks coupled between a relatively low magnitude reference voltage and a battery supply switch unit that is operative to selectively couple first and second battery voltages to said biasing unit, and wherein said biasing unit is operative to switchably decouple each of said switchable voltage divider networks from said battery supply switch unit, while coupling said relatively low magnitude reference voltage through said voltage divider network to reference voltage ports of all front end transconductance circuits of said multi-mode, multi-gain tip/ring amplifier unit, so as to effectively place said subscriber line interface circuit in a powered down condition.

6. The high voltage analog circuit according to claim 1, wherein said multi-mode, multi-gain tip/ring amplifier is coupled to controllably supply said tip and ring conductors of said subscriber loop pair with respectively different sets of DC voltages, in accordance with the intended mode of operation of said subscriber line interface circuit.

7. A high voltage analog circuit for a subscriber line interface circuit comprising:

an input signal receiving unit, that is operative to condition and interface input voice and low voltage signaling and ringing signals, supplied from a digitally programmable signal generation and processing unit;

a multi-mode, multi-gain tip/ring amplifier unit, having tip and ring outputs thereof adapted to be coupled to tip and ring conductors of a subscriber loop pair, and inputs coupled to receive and amplify said voice and low voltage signaling and ringing signals from said input signal receiving unit, in accordance with a selected mode of operation and gain of said subscriber line interface circuit;

a biasing unit, to which power for operating said high voltage analog circuit is coupled, and being operative to controllably couple bias voltages to said tip and ring amplifier sections of said multi-mode, multi-gain tip/ring amplifier unit in accordance with the mode of operation of said subscriber line interface circuit; and a feed-forward network coupled between inputs of respective tip and ring stages of said multi-mode, multi-gain tip/ring amplifier unit and an analog feedback monitor port to an auxiliary amplifier for synthesizing the output impedance of said subscriber line interface circuit, said feedforward network being configured to inject complementary zeros in the closed loop response characteristic of said subscriber line interface circuit.

8. A high voltage analog circuit for a subscriber line interface circuit comprising:

an input signal receiving unit, that is operative to condition and interface input voice and low voltage signaling and ringing signals, supplied from a digitally programmable signal generation and processing unit, said input signal receiving unit containing voltage-sense, current-feed circuits having resistors associated with drive signal currents supplied by said input signal receiving unit, wherein voltage drops across said resistors of said voltage-sense, current-feed circuits are required for proper operation of said voltage-sense, current-feed circuits, while effectively reducing power supply voltage available to said subscriber line interface circuit; and a multi-mode, multi-gain tip/ring amplifier unit, having tip and ring outputs thereof adapted to be coupled to tip and ring conductors of a subscriber loop pair, and inputs coupled to receive and amplify said voice and low voltage signaling and ringing signals from said input signal receiving unit, in accordance with a selected mode of operation and gain of said subscriber line interface circuit, said multi-mode, multi-gain tip/ring amplifier unit including tip and ring sections, each of which contains a plurality of front end transconductance circuits coupled to a shared operational amplifier gain section, and having different valued feedback resistors coupled from an output of said gain section to inputs of respective ones of said front end transconductance circuits, that define respectively different gain characteristics with said input resistors associated with drive signal currents from said input signal receiving unit; and wherein said feedback resistors have values that are derived in accordance with values of said resistors of said voltage-sense, current-feed circuits having been defined for proper operation of said voltage-sense, current-feed circuits, while making sufficient power supply voltage available to said subscriber line interface circuit.

9. The high voltage analog circuit according to claim 8, wherein said voltage-sense, current-feed circuits include current mirror circuits containing power supply rail-coupling resistors that are operative to mitigate against Early voltage, and wherein said voltage drops required for proper operation of said voltage-sense, current-feed circuits correspond to voltage drops across said power supply rail-coupling resistors.

10. A method of operating a high voltage analog circuit for a subscriber line interface circuit, said high voltage analog circuit including:

an input signal receiving unit, that is operative to condition and interface input voice and low voltage signaling and ringing signals, supplied from a digitally programmable signal generation and processing unit, a multi-mode, multi-gain tip/ring amplifier unit, having tip and ring outputs thereof adapted to be coupled to tip and ring conductors of a subscriber loop pair, and inputs coupled to receive and amplify said voice and low voltage signaling and ringing signals from said input signal receiving unit, in accordance with a selected mode of operation and gain of said subscriber line interface circuit, and a biasing unit, to which power for operating said high voltage analog circuit is coupled, and being operative to controllably couple bias voltages to said tip and ring amplifier sections of said multi-mode, multi-gain tip/ring amplifier unit in accordance with the mode of operation of said subscriber line interface circuit, said method comprising the steps of:

(a) providing a feedforward network that is configured to inject complementary zeros in a closed loop response characteristic of said subscriber line interface circuit; and (b) coupling said feed-forward network between inputs of respective tip and ring stages of said multi-mode, multi-gain tip/ring amplifier unit and an auxiliary amplifier for synthesizing the output impedance of said subscriber line interface circuit.

11. A method of configuring a high voltage analog circuit for a subscriber line interface circuit comprising the steps of:

(a) providing an input signal receiving unit, that is operative to condition and interface input voice and low voltage signaling and ringing signals, supplied from a digitally programmable signal generation and processing unit, said input signal receiving unit containing voltage-sense, current-feed circuits having resistors associated with drive signal currents supplied by said input signal receiving unit, wherein voltage drops across said resistors of said voltage-sense, current-feed circuits are required for proper operation of said voltage-sense, current-feed circuits, while effectively reducing power supply voltage available to said subscriber line interface circuit;

(b) providing a multi-mode, multi-gain tip/ring amplifier unit, having tip and ring outputs thereof adapted to be coupled to tip and ring conductors of a subscriber loop pair, and inputs coupled to receive and amplify said voice and low voltage signaling and ringing signals from said input signal receiving unit, in accordance with a selected mode of operation and gain of said subscriber line interface circuit, said multi-mode, multi-gain tip/ring amplifier unit including tip and ring sections, each of which contains a plurality of front end transconductance circuits coupled to a shared operational amplifier gain section, and having different valued feedback resistors coupled from an output of said gain section to inputs of respective ones of said front end transconductance circuits, that define respectively different gain characteristics with said input resistors associated with drive signal currents from said input signal receiving unit; and (c) setting values of said resistors of said voltage-sense, current-feed circuits for proper operation of said voltage-sense, current-feed circuits, while making sufficient power supply voltage available to said subscriber line interface circuit; and (d) limiting values of said feedback resistors in accordance with said values of said resistors of said voltage sense, current-feed circuits as set in step (c).

12. The method according to claim 11, wherein said voltage-sense, current-feed circuits include current mirror circuits containing power supply rail-coupling resistors that are operative to mitigate against Early voltage, and wherein said voltage drops required for proper operation of said voltage-sense, current-feed circuits correspond to voltage drops across said power supply rail-coupling resistors.

* * * * *

UNITED STATES PATENT AND TRADEMARK OFFICE

CERTIFICATE OF CORRECTION

PATENT NO. : 7,206,405 B2
APPLICATION NO. : 10/179777
DATED : April 17, 2007
INVENTOR(S) : Leonel Ernesto Enriquez et al.

It is certified that error appears in the above-identified patent and that said Letters Patent is hereby corrected as shown below:

In the claims:

Claim 1, column 14, line 42, replace “multigain” with --multi-gain--.

Claim 1, column 14, line 62, replace “multimode, multigain” with --multi-mode, multi-gain--.

Claim 2, column 15, line 37, replace “multimode” with --multi-mode--.

Claim 7, column 16, line 48, after “circuit” add --wherein said feed-forward network includes an auxiliary tip path resistor-capacitor circuit coupled between an inverting input of a tip amplifier's unity gain transconductance section and said analog feedback monitor port, and an auxiliary ring path capacitor coupled between the non-inverting input of a ring amplifier’s unity gain front end transconductance section and said analog feedback monitor port--.

Claim 10, column 17, line 54, replace “;” with --,wherein step (a) comprises configuring said feed-forward network as an auxiliary tip path resistor-capacitor circuit that is coupled between an inverting input of a tip amplifier’s unity gain transconductance section and said analog;--

Signed and Sealed this

Fifth Day of June, 2007

JON W. DUDAS

*Director of the United States Patent and Trademark Office*